United States Patent [19]

Graf

[11] 4,249,188

[45] Feb. 3, 1981

[54] UNCHARGED INK DROP RASTERING, MONITORING, AND CONTROL

[76] Inventor: Ronald E. Graf, Oak Dr., Park View, Rte. 3, Box 520, Crozet, Va. 22932

[21] Appl. No.: 15,802

[22] Filed: Feb. 27, 1979

[51] Int. Cl.[3] .......... G01D 15/18

[52] U.S. Cl. .......... 346/75

[58] Field of Search .......... 346/75

[56] References Cited

U.S. PATENT DOCUMENTS

| | | | |
|---|---|---|---|
| 3,769,624 | 10/1973 | Lee | 346/75 X |
| 3,787,882 | 1/1974 | Fillmore | 346/75 |
| 3,893,623 | 7/1975 | Toupin | 346/75 X |
| 4,023,183 | 5/1977 | Takano | 346/75 |
| 4,059,183 | 11/1977 | Hoskins | 346/75 X |
| 4,075,636 | 2/1978 | Galetto | 346/75 |
| 4,091,390 | 5/1978 | Smith | 346/75 |
| 4,138,686 | 2/1979 | Graf | 346/75 |

OTHER PUBLICATIONS

Fan et al.; Drop Shutter for Ink Jet Printing; IBM Tech. Disc. Bulletin, vol. 16, No. 3, Aug. 1973, p. 989.

*Primary Examiner*—Joseph W. Hartary

[57] ABSTRACT

A method of controlling the impact points of successive selected droplets in a particular ink stream operating on a drum type printer capable of controlling uncharged non-magnetic droplets, as described in U.S. Pat. No. 4,138,686 is disclosed. Further the grid formed by any single stream can be made rectangular with one axis parallel to the direction of motion of the output medium relative to the droplet selector, to facilitate the simultaneous formation of properly oriented print characters. Phase and speed of contacting droplets relative to sites uniformly spaced around a rotating drum are sensed and controlled in a new way.

Also an impacting sequence to produce a line of upright characters with the sequence to be reversed if the line is traversed in the opposite direction is disclosed. A method for producing both the sequence and the reverse sequence using a single droplet stream whose origin moves parallel to the line of characters, and whose droplet velocities are controllably changed only in a single plane, which plane contains the velocity of each controlled droplet with respect to the droplet stream origin, the same plane being used for all impacting droplets whether in sequence or reverse sequence, is shown. In other words, neglecting gravity and aerodynamics all image droplet velocities are controllably rotated about a single vector in space.

Also an impacting sequence to produce a rectangular array of impact points more closely spaced in both array directions than the actual simultaneous impact points, while all impact points relative to the droplet selector remain in a constant position, is disclosed, i.e. the droplet stream directions need not be controlled.

4 Claims, 12 Drawing Figures

UNCHARGED INK DROP RASTERING, MONITORING, AND CONTROL

BACKGROUND OF THE INVENTION

This invention is in great part an extension of U.S. Pat. No. 4,138,686 to show in more detail how the printing method claimed therein can be applied in specific configurations for best results. The method of droplet selection and in some cases the method of dispersal, perpendicular to the motion of the output, of successive impact points of droplets from a particular stream, have been previously described. However, a more detailed discussion of droplet impact sequencing schemes (rastering) and implementation methods therefor would be useful.

Further, since successive droplets from a particular stream impact the output at slightly different times during a scan interval, a correction must be made for motion of the output means relative to the selector means, so that all droplets in a scan will impact the output at points along a line on the output surface and perpendicular to its direction of motion. Further for best output results corrections must be made for predictable unequal droplet travel times, due to a preceding droplet being unselected for impact and thus disrupting air flow along the droplet stream.

Also a new means to continually synchronize droplet arrival times at selector sites with site activation times in case droplet speeds drift during operation will be discussed in detail for various versions of the contact electrostatic selectors, such as those described in U.S. Pat. No. 4,138,686.

SHORT STATEMENT OF THE INVENTION

This application is a logical continuation of the concept in U.S. Pat. No. 4,138,686. The claims of the original patent mainly concerned methods of selecting droplets for impact or not on an output means. The selection methods of the previous patent were new in that they operate by causing controllable variable electrostatic forces to act on substantially uncharged, and non-magnetic droplets during contact between said droplets and portions of the printer surface so that droplet velocities (mainly direction) are controllably variably altered during said contact. The final velocity, after contact is broken with said portions of the printer surface, determines whether a droplet will contact the output surface or not. Also in the case of the drum version, a method of spreading droplet impact points prependicular to the motion of the output means was disclosed but not claimed in the allowed patent.

The present invention discusses old and new methods of controlling droplet velocities to controllably spread on an output the droplet impact points of droplets selected using the above selection principle from a particular stream. It also discloses some associated rastering schemes to produce printed characters compatible with the selection methods and impact point spreading methods.

The first rastering scheme is accomplished by independent control of the droplet impact points in two directions on the output (with more than one possible control principle shown for each direction), so that each stream can independently form a rectangular array of impact points without assuming output motion relative to the stream origin. The impact points are corrected to produce a rectangular array during motion.

The second method employs control of the droplet impact points for a single stream in one direction and couples this with uniform motion of the output relative to the droplet controller in a second direction and or the reverse of that second direction. It is shown how a rectangular array of impact points can be produced during uniform motion of the output relative to the selector in either direction without changing the one control direction when the motion is reversed. Actually the selector is more likely to move than the output during character formation. One such selector can be moved forward across a page to form a line of characters and then back across a page to form another line of characters. Alternately, a group of these selectors-controllers can be placed in a row and each can produce a column of characters as a page is lowered with respect to the selectors.

The third method employs no control of droplet impact points relative to the selector. A rectangular array of droplet impact points can be produced by this method on a uniformly moving output medium, with the spacing between impact points in either direction parallel to the sides of the rectangle being less than the spacing between droplet streams. The simultaneous stream impact points, except at the extreme corners, occur along a diagonal of a sub-rectangular array within the larger rectangular array, the sub-rectangular array having the same directions for its two sides as the larger array. The larger array would usually represent a line of print or a set of lines or columns of print.

During discussion of the first rastering scheme a drum is used as an example of a controller. It controls a number of droplet streams. Although it is possible to allow a stream of ink to break into droplets on the drum surface due to surface irregularities, it will be assumed for purposes of this disclosure that the stream breaks into droplets before arriving at the drum. A new method of synchronizing the phase of droplet arrival with control site arrival at the corresponding contact point between droplets and the drum is disclosed. Also droplet speed relative to control site speed can be simultaneously found. Droplet frequency is adjusted to site frequency before synchronizing of phase. The synchronization techniques depend on sensing at various times and at various sites the area of simultaneous contact between a droplet and the controller over a monitor site, two monitor areas, which two areas are held at different voltages.

The same sensing method and monitor sites can be used to sense the contacting presence of other fluids, such as intravenous solutions in hospitals, and chemical reagents. The electrical charge on the site is proportional to the area of contact. The charge can be detected by integrating the current in the electrical circuit producing the charge, i.e. the circuit holding the two areas at different voltages. The rate of flow of an intravenous solution is currently measured by recording the passage of one droplet at a time as the droplet passes through a light beam entering an electric eye. The passage of a droplet could equally well be recorded at a monitor site, without the added expense of providing a light source and an electric eye.

BRIEF DESCRIPTION OF THE DRAWINGS

Other features, objects, and advantages of the present invention will become apparent upon examination of the following detailed description, appended claims, and the accompanying drawings in which:

DETAILED DESCRIPTION OF THE INVENTION

Figure 1A:
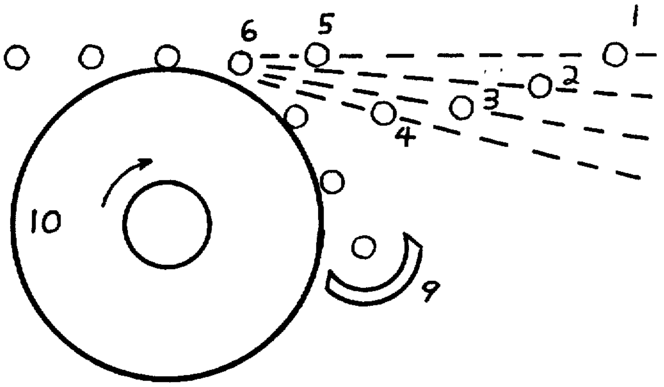
FIG. 1A and FIG. 1B are a side view and a top view of droplet streams and a drum-type controller with some detail omitted.
Figure 1B:
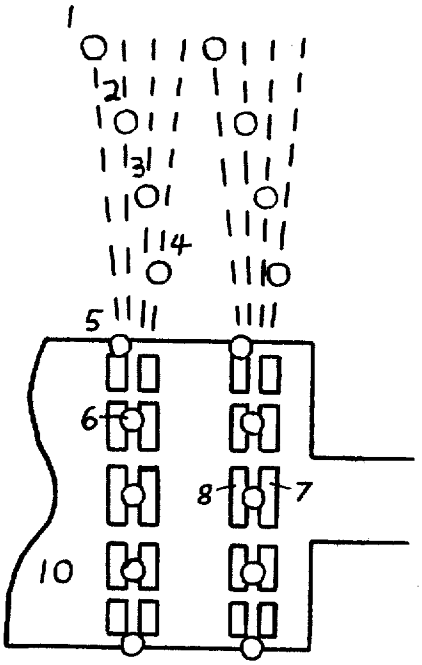
Figure 2A:
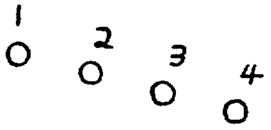
FIG. 2A shows the positions of the droplet impact points relative to the stream source, for one stream.
Figure 2B:
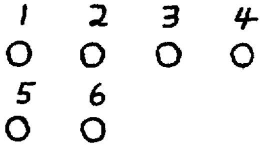
FIG. 2B shows the corresponding positions of the droplet impacted points on the output, from the same one stream.

A first impact position sequencing scheme for spreading droplet impact points of particular streams applies to the rotating selector drum method of the previous patent. FIGS. 1A and 1B show a side view and a top view of two droplet streams controlled on a selector drum. Normally there would be more droplet streams and the spread angles were exagerated. Also, for purposes of illustration, all droplets of FIG. 1B are pictured as selected; and those of FIG. 1A are shown in both their selected and unselected positions. Unselected droplets would proceed to catcher (gutter) 9. Selected droplets are numbered correspondingly 1 to 6 in FIGS. 1A, 1B, 2A, and 2B. Their impact points in space relative to the selector are shown in FIG. 2A, and their impacted points on the output medium relative to said output medium, which is moving with respect to the selector, are shown in FIG. 2B. It should be understood throughout this specification and claims that whenever a droplet impact point or path is spoken of the impact point or path of the main droplet body is intended. Small ancillary droplet parts may break off and their disposition will be discussed in future patent applications. Also the droplets may be shaped more like sections of string a few times longer that their diameter than like spheres.

The distance points 5 and 1 in FIG. 2B is the distance moved by the output means relative to the selector between the time of impact of droplet 1 and droplet 5 on said means. Notice that the pattern of droplet impact points shown in FIG. 2B is rectangular and aligned with the direction of motion of the output means. The points in FIG. 2A will be in a straight line and uniformly spaced if the time interval between droplet arrivals is uniform. If the intervals are not uniform, due to certain droplets being unselected and missing from the impact pattern and thus not dragging the next successive droplet along at the same speed, then a correction of impact position by the distance the output moves during the excess time must be made in FIG. 2A to produce the rectangular pattern of FIG. 2B. The effect can be correced for, since it is always known whether a previous droplet has been selected before it is necessary to control a subject droplet. Also one of the two control directions is in the same direction as the relative motion of the output with respect to the selector. The time lag effect may also be eliminated in various ways shown in prior art, such as introducing unused drops between used ones or blowing air along the droplet path so that the droplet air speed is zero. A novel way to eliminate the effect will be the subject of a future patent application now being drafted. Eratic motion of the output can also be corrected for if the position of the output means is sensed.

The sideways force, which causes the spread in droplet paths shown in FIG. 1B can be produced by the methods mentioned in U.S. Pat. No. 4,138,686 or by some other method. The first of the previous methods relies on adhesion to elements of surface which protrude with respect to the average drum surface more on one side of a droplet than on the other by various amounts depending on the position of a droplet around the drum. Thus successive droplets are drawn by various amounts toward the side of greater protrusion. In order to be compatible with the wording of the selector, the adhesion force used to draw droplets sideways should be less than the electrostatically enhanced surface force acting to select which droplets will reach the output. Of course, the adhesion to the protruding side could be enhanced at appropriate times by an appropriate voltage difference applied between two areas on the protruding surface. Actually for best results in a printer in which drops are controlled electrostatically during contact, it is best that the droplets do not wet the contacted surfaces which will produce the electrostatic control forces. Many combinations of droplet substance and surface substance can be found in which the liquid does not wet the surface, in the absence of applied voltages.

The second of the previous methods used to cause the sideways spread of droplet paths shown in FIG. 1B relies on providing air streams from orifices, each associated with a position to be occupied, site, on the selector drum. The stream from each orifice affects substantially only droplets leaving from the associated drum position. If the droplet is being held at the drum site past the point at which it would have flown off if selected for output, then it will tend to be flattened and elongated on the drum surface during the time it is held. Thus the sideways air stream would be aimed to flow over the droplet, and not substantially affect it. On the other hand, as a selected droplet begins to leave the surface of the drum, it will present a larger area to the air flow and will be directly affected by the sideways air stream, which is mainly in the axial direction with respect to the drum. The droplet is, of course, moving at approximately the same speed as the drum surface. Notice in FIG. 1B that equal sideways deviations and approximate forces are applied to all those droplets hitting the selector drum simultaneously. A different force is applied to the next successive droplet in each stream. Thus the air streams at a given distance around the drum, producing substantially the same sideways force, will have a tendency to reinforce each other. The forces are a function of position around the drum but not significantly of which stream the droplet is in. Due to edge effects it may be necessary to produce slightly stronger air streams at the extreme ends of the drum or to include unselected guard streams at either end of the drum, the droplets in said guard streams being always guttered.

The force causing the vertical spread of droplet paths, the spread being shown in FIG. 1A, can be caused by the following three methods among others. First the air streams mentioned in the previous paragraph can have a component in the radial direction, which may or may not be proportional to the axial component. The differing radial components will cause the spread shown in FIG. 1A.

A second method for causing the vertical spread in droplet paths shown in FIG. 1A employs the electrostatic force used to hold unselected droplets on the surface of the drum. The electrostatic force which acts mainly toward the drum would either be smaller or applied for a shorter time than when used to cause an unselected droplet to arch around the drum and travel to the gutter. It is very desirable, when using this second method, that the liquid droplet should not wet the printer surface when an electrostatic force is not being applied to the droplet due to applied voltage.

Describing the application of electrostatic forces at the drum surface in more detail, the sites on the surface of the drum, which cause the electrostatic forces act in groups on individual droplets, sites 7 and 8 of FIG. 1B being such a group, hereafter to be refered to as a single site on the drum. Also, the electrostatic forces are applied predominantly during contact between droplets and sites. The droplet substance is preferably an electrolyte, to provide internal electrical conduction so the whole droplet can be substantially at one voltage. It is also preferable that the droplet substance not wet the drum surface when said groups of electrostatic forces are not applied. The non-wetting aspect not only allows larger differences between controllably applied forces (electrostatically controlled) and uncontrolled surface forces (adhesion), but the non-wetting aspect also aids in cleaning the drum surface, since droplets will tend to leave as a whole if non-wetting, instead of leaving part of their droplet surface behind on the printer surface. Also droplets tend to stay more spherical and are less likely to break apart if they do not wet the contacted drum surface.

The groups of sites can be controllably charged and discharged electrically in more than one way. The most responsive method would be to connect the surface drum sites to an electronic logic attached to and riding with the drum. Power and logical control can be provided by using a transformer to exchange information and power between the drum and the rest of the printer. For purposes of discussion we will speak of a primary and a secondary coil of the transformer although information can be sent in either direction, or a second set of coils may be employed. The secondary coil can be fixed to the drum axis and wound like a helix about the axis. The primary coil can be like a helix wound just outside the secondary coil but attached to the non-rotating part of the printer. Since both the primary and secondary coil have the same magnetic axis (parallel to the drum rotation axis), and since the secondary coil can be wound so that the magnetic axis coincides with the drum rotation axis so that it does not substantially move during drum rotation, the drum rotation will not substantially affect voltages induced in either coil. There may be approximately 1000 droplet sites around the drum, thus the command frequency would be very large compared to the drum rotation frequency, and proper circuits could filter out any residual unwanted voltages. Alternating current power could be converted to direct current to control logic voltages.

If the droplets of a particular stream are formed the stream after the stream contacts the drum, the stream being a spatially unbroken body of liquid before contact with the drum, the droplet formation being due to surface irregularities on the drum, then the droplet phase and frequency can be automatically correlated with drum site phase and frequency. The droplets will be formed at the drum sites by breaking a stream between the sites. Surface irregularities, such as knife edges of material, which the stream substances does not significantly adhere to or wet, may be placed between sites and cut the incoming stream into stringlets, which adhere to drum sites on which a temporary voltage difference is applied. The stream substance is moving with the same speed as the drum surface, so the relative motion at the point of contact is substantially radial. The stringlets after formation and capture on the sites are later released when voltage is removed from the sites at appropriate times to obtain for each droplet either one of a group of trajectories leading to the output or a trajectory leading to a gutter. The sudden application of electrostatic forces at the drum sites with no such force used between sites will also tend to break a stream of ink droplets (stringlets). Again it is desirable that the ink not wet the drum surface between sites or at sites to which no voltage is being applied.

Assume now that we wish to operate with a stream of droplets not spatially connected before contact with the printer drum, that is, the droplets are formed before contacting the printer drum. In order to make the droplet frequency, phase and speed equal to drum site frequency, phase, and speed various methods would suffice one of which, employing a novel method to be claimed herein, will be here described. It is first necessary to roughly equalize droplet speed and drum surface speed. The frequency and surface speed of the drum sites can be calculated from the rotation rate, number of revolutions per second, since the drum circumference and number of sites around the drum are both known. The rotation rate can be sensed by using a small reflector strip attached on the drum and a photocell fixed to the rest of the printer. The period of rotation is the interval between successive sensings of the reflective strip. Alternately a magnet attached to the drum could be sensed by a fixed coil, or a read head such as is used to read information from computer disc storage. The pressure in the droplet stream should now be adjusted to give the droplets a velocity equal to the drum site velocity. Actually either drum velocity or expected droplet velocity or both could be adjusted to some operating value.

Once the two speeds have been roughly equalized in an operating range, it is now necessary to set the droplet formation frequency equal to the drum site frequency, the drum site frequency being already precisely known from the drum rotation rate. The droplets are usually formed because of electronic excitation of the stream; and the excitation frequency can be easily controlled. Thus the two frequencies can be made almost precisely equal, assuming that the drum rotation rate can be stabilized.

Figure 3:
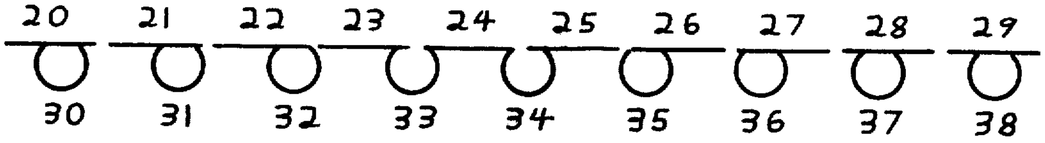
FIG. 3 shows a series of drum sites with curvature removed, which may be reinterpreted as a series of time intervals during which successive sites pass a given point; and a series of droplets, which contact the drum sites at some point, and are subject to a similar interval interpretation are shown.

It is now desirable to adjust the droplet arrival phase so that the droplets land near the centers of the control sites on the drum surface. It is also desirable to adjust the droplet speed to more precisely match the drum speed so that a droplet will not contact more than one control site during its stay on the drum. Alternatively, to equalize the two speeds, droplet speed could be left constant and drum speed combined with droplet frequency could be simultaneously adjusted. Both the adjustment of phase and the equalization of speed can be monitored by using a droplet stream and a special monitoring set of drum sites, called monitor sites, as shown in FIG. 3. As will be discussed later a control site may also be used as a monitor site. The stream which is monitored may be an extra droplet stream at either end of the drum or each stream may be separately monitored at special groups of sites around the drum, the special groups corresponding to spaces between lines of printing. The monitor droplets will be attracted to the drum and carried part way around as part of the monitoring process, so the monitor droplets may easily be guttered. In some possible designs some droplets selected to impact the output may also be used in the monitoring process if they are affected by electrostatic fields at control sites.

Ten monitor drum sites numbered 20 through 29 are shown in FIG. 3 in an interval equal to the interval which would contain nine control drum sites. For convenience in wording and explanation, the sites are shown on a straight line rather than on an arc of a circle. The line may be thought of as representing time. The sites and droplets may be thought of as representing time intervals during which the sites or droplets pass a given point in space near the point at which droplets contact sites. Immediately below the monitor drum sites are shown nine droplets spaced with the same spacing they would have in a droplet stream with the same speed and frequency as the drum control sites (not shown). Both the droplets and monitor sites are considered to be moving to the right in the figure, or from another viewpoint future times are to the left. Notice that the droplets are approximately in phase with site numbered 29. They are most out of phase with site number 24. This phase can be sensed electronically. Thus the phase can be adjusted to match at the monitor site which corresponds to the phase of the character forming control sites. The site in phase and the site out of phase are always located five sites apart, if ten monitor drum sites and nine droplets are used, (if ten monitor sites occupy the same interval as nine control sites). Other numbers of sites and droplets could be used in an analogous fashion. Assuming for a moment that the droplets are moving at the same speed as the monitor sites, we wish to center the droplet impact points on the control sites.

The time interval between successive droplets impacting the drum is uniform. Calling the electrical circuit which activates site 20 circuit 20 and so forth, current will rise in circuit 20 starting at the time of droplet impact on site 20. Assuming that all droplets impact the drum at the same drum radius, current will begin to rise in circuit 21 exactly one droplet time interval later than for circuit 20. However current will rise in the circuit 25 exactly one droplet interval later than current will rise in circuit 23, even though site 25 is not immediately next to site 23. Thus an interval discontinuity occurs at site 24. Thus site 24 is the out of phase site for droplet arrival positions. The phase of droplet formation may now be adjusted to move the in phase site to the site corresponding to the control site positions.

Two methods will be shown to determine whether the droplets are moving faster or slower than the drum sites. For the first method notice the following. If the droplets are moving sufficiently faster than the drum then droplet 30, which would correspond to a droplet 39 in phase if there were one pictured, will begin flowing off its site 20 a shorter time after impact than droplet 38 will flow off of its site 29. Also droplet 37 would require a longer time to flow to the right with respect to site 28 and begin to leave site 28. Conversely, if the droplets are moving slower than the drum then their times elapsed to begin leaving their sites would be inversed. If during the above described flows the droplets are held to the drum sites by a constant voltage, and the droplets speed relative to the monitor sites is sufficiently large, then a reverse current will begin to flow at a site from which a droplet is beginning to depart. This reverse current happens because movement of the tail of the droplet toward the main body of the droplet tends to reduce droplet area of contact. The induced electric charge holding the droplet to the site is proportional to contact area. This is true if the droplet material is an electrolyte thus insuring internal electrical conductance. The times at various sites between droplet impact and the onset of reverse current can be measured and will be a function of the droplet drift rate (the difference in speed between the droplets and the monitor sites), and a function of which direction the droplets are drifting with respect to the drum, and the phase of individual sites. If the droplets never drift off the most in phase drum site, which is site 29 in FIG. 3, this might be considered sufficient equalization of speed. If further refinement of speed is desired, then look for reverse current at other drum sites and adjust droplet speed in an obvious way to eliminate the drift causing the reverse current.

If there is no reverse current it still may be possible that some droplets are bunching at one end of a site held by electrical edge effects, thus covering less total area on a drum site than droplets impacting further back on sites. The tails of droplets impacting further back on their sites will remain further back on the sites as the droplets drift. This asymmetry from one site to the next of area are covered can be sensed by integrating the current used to hold each droplet on a site, thus obtaining the total charge at the interface between the site and droplet. The total charge, integral of the current, is proportional to the total area covered. Droplets impacting closer to the site ends, toward which they are drifting and bunching, will produce smaller total areas and charges. Thus it can be deduced in which direction the impacting droplets are drifting with respect to the drum by the asymmetric distribution of the site charges around the site most in phase. For instance, if the droplets are both moving to the right and drifting to the right relative to the sites in FIG. 3, then total charge at site 28 will be greater than the maximum charge at site 20, assuming that droplets 37, 38, and 30 never leave their sites but bunch at the right end of their sites before being ejected from the drum. Thus under these circumstances a slight reduction in droplet speed would be an indicated remedy.

The charge asymmetry, total current asymmetry, will be present at times of less mismatch of speed than that producing the reverse current effect; however the charge asymmetry will also be present at times when the reverse current effect exists. Thus the total or maximum charge asymmetry effect is probably a more useful basis for a method of matching droplet speed with drum speed than the reverse current effect.

The fact that total charge is proportional to the area of contact between an electrolyte and a site where two different site voltages are contacted by a single liquid body (droplet) can be used to monitor the drops of intravenous solution given a patient in a hospital. Any liquid can be measured if broken into droplets, which produce a charge in passing a site maintained at two simultaneous voltages, at two parts of the site. This will be covered in claim 1.

Before proceding, it should be pointed out that control sites may also be used for monitor sites, if current in a control site circuit is monitored. Also additional monitor sites, similar to the control sites but possibly covering a smaller area could be interposed anywhere between control sites. This could be equivalent to having monitor sites with half the spacing of control sites, if a monitor site is placed exactly in the middle between each pair of control sites, since both the monitor and the control sites could be used to monitor the phase of droplets. Phase should, in this case, be adjusted so that droplet arrivals are in phase with control sites and out of phase with any monitor sites which are not also control sites. If due to a difference in speed between the droplets and the control sites some droplets drift off control sites after contacting them, then a previous monitor site will be contacted by the drifting droplets if the droplets are too fast. Conversely, if the droplets are too slow, the next succeeding monitor site to pass a given reference point will be contacted. Thus it is possible to correct droplet velocity to prevent droplets from drifting or slipping off contacted control sites until released by a reduction in electrostatic force.

If the speeds are only slightly mismatched, then the effect causing the charge asymmetry previously described may be present even though the droplets do not drift off the edge of a control site. Thus if maximum charge is less than expected this will be an indication of a mismatch in speed between sites and droplets, causing a bunching of droplet fluid at the ends of the control sites. If a change in speed increases the effect then the speed should be altered in the opposite way to maximize control current at all control sites.

It should also be pointed out that monitor sites and control sites in conjunction may also be used to control chemical reaction materials, and may even more generally be used to measure and control any liquids. Monitor sites without control sites can be used to monitor liquids whether or not the liquids are in droplet form.

A third method for causing the vertical spread in droplet paths shown in FIG. 1A would involve raising parts of the drum surface above others, thus causing droplets controlled by higher surface elements to bounce more or to leave the drum at a larger radius, thus causing a higher trajectory. The difference in drum surface elevation between successive sites need be only very small, because the distance between successive lines of droplets on the output is relatively small (a fraction of the height of a character) if characters are to be printed. The relative motion of a droplet with respect to the drum during approach is approximately radial, so the different elevations of the sites on the drum surface, if not excessive will not interfere with droplet arrival or departure. If necessary, an intermediate always guttered droplet could be introduced between each successive scan, i.e. between droplets 4 and 5, in order to introduce an intermediate surface elevation site.

Figure 4:
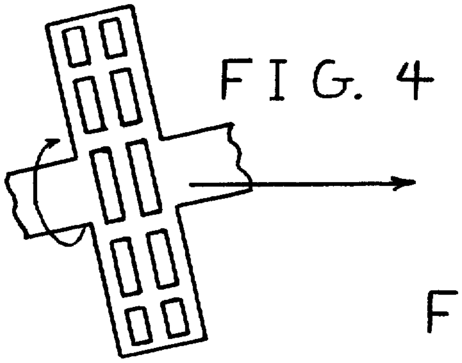
FIG. 4 shows a one track droplet controller.
Figure 5A:
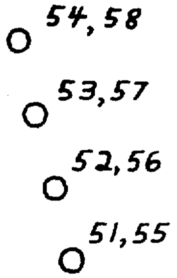
FIG. 5A shows droplet impact points relative to the controller.
Figure 5B:
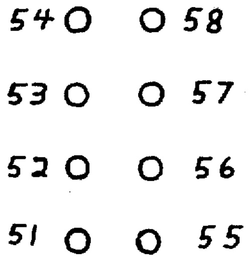
FIG. 5B shows droplet impacted points on an output means.

A second impact point sequencing scheme, more appropriate for typewriters, is shown in FIGS. 4, 5A, and 5B. The scheme is most useful when it is desired to use a single stream of droplets to print a line of characters, and when either the stream or the output means is to be moved relative to the other along the line of characters. A series of droplets which impacted the output are numbered from 51 to 58 in their order of formation. FIG. 5A shows the positions of the impacted points relative to the selector, and FIG. 5B shows the positions of the impacted points relative to the output. The distance between points 51 and 55 or 52 and 56 in FIG. 5B is the distance moved by the droplet selector relative to the output medium during the interval between the impact of droplet 51 and that of droplet 55. Notice that the pattern of droplets shown in FIG. 5B is rectangular and aligned with one axis along the line of characters. This type of pattern of droplet impact points can be produced if the relative impact points can be controlled in one direction as shown in FIG. 5A. The direction (control orientation) should be chosen with a component in the direction of motion of the selector relative to the output means. In FIG. 4 the selector moves to the right as shown by the arrow; and in FIG. 5A the control orientation runs from lower right to upper left as shown by the line containing all the droplets. FIGS. 4, 5A, and 5B all refer to the same device.

If the control orientation is chosen so that the pattern of impact points can be made rectangular, as shown in FIG. 5B, when the line of characters is traversed in one direction at a given uniform speed; then the same control orientation will produce a rectangular set of impact points when the lines of characters is traversed at the same speed in the opposite direction, assuming that the time interval between successive droplets remains constant and that the droplet impact points for the line are all chosen in the reverse order, i.e. if the droplets shown in FIG. 5A and FIG. 5B impact in the order 58, 57, . . . 51. Thus the representation in terms of order of impacts and non-impacts for a particular character must be exactly reversed when a line of characters is produced with the selector moving in the reverse direction with respect to the output.

There are many means to cause a single orientation controllable spread in droplet paths such as is shown in FIG. 4. The electrostatic means used to cause the vertical spread in each stream of FIG. 1A has been discussed and could be used if reoriented slightly. It is shown in FIG. 4 with the necessary orientation, rotation, and direction of motion indicated to cause droplets to impact as in FIGS. 5A and 5B. Another means of controlling uncharged droplets in a single orientation will be the subject of another pending application. Of the many possible means, one more example will be given consistent with U.S. Pat. No. 4,138,686.

Figure 6:
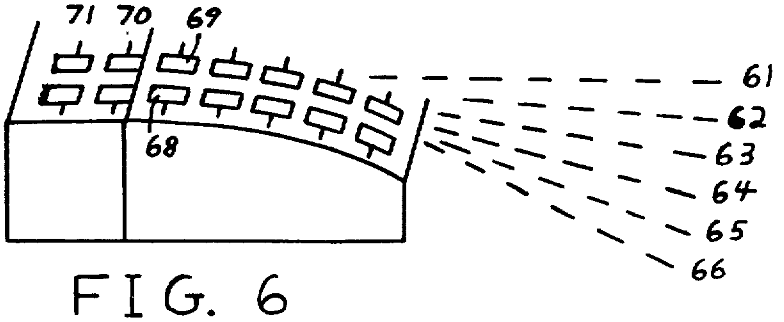
FIG. 6 shows a selector-controller which rotates droplet velocities around a single axis.

FIG. 6 shows a selector composed of a series of pairs of electrifiable plates, such as plates 68 and 69, the centers of each pair being all substantially located in the same plane called the control plane. This selector can replace the one shown in FIG. 4. A series of droplets would be used in FIG. 6 spaced at about the same separation distance as the pairs of plates. Each droplet visits a number of pairs of plates in series until it departs from an unactivated pair, and simultaneously from the selector. Plate pair 70 and plate pair 71 represent two phase detectors, which are monitor sites. They act the same as the monitor sites previously described in that the integral of current in the monitor circuit (charge) indicates total area of contact between activated portions of a monitor and a droplet. The monitor sites are used so that the other pairs of plates can be activated at the proper times, and so that the droplet formation rate can be adjusted to equalize the separation distance between droplets with the separation distance between pairs of plates. The placement of these phase detectors (monitor sites) could be changed. If one is placed further down beyond the control pairs then guttered drops could be used to adjust phase. Actually, the current within control pair circuits could be used as an indication of phase, since current rises rapidly as a droplet begins to be affected by the pair and to increase its area of contact with the pair. Thus phase detectors separate from the control pairs would be unnecessary, and control sites could double in function as monitor sites. Also, if desired, the phase of each pair of control plates relative to the previous pair and relative to droplet arrival times could be adjusted individually, whenever a droplet to be guttered arrives at each pair of plates, because current begins to rise at the arrival time of a new droplet and falls at the departure time of the previous droplet. Thus the period during which each droplet contacts a site is well established. Since there are spaces between characters and lines there will be plenty of guttered droplets. The phase of droplets relative to site activations could be manually adjusted by an operator if droplet speed and frequency are factory preset within a good operating range; however, it is more convenient to adjust phase and droplet separation electronically before each operation of the equipment and during operation.

The paths 61 through 66 represent various paths on which droplets could leave the selector-controller. The paths are all in the same plane, and the selector should be oriented to make this plane coincide with the control plane previously refered to and containing the droplets of FIG. 5A. Some of the possiblepaths may never be selected. The extreme path will be selected only to send tose droplets not selected for output to a gutter. The pairs of electrifiable plates may be covered with a dielectric material. They will be activated by causing a voltage between plates at a time both before the arrival time of each particular droplet and after the departure time of the previous droplet. The activations will occur for a particular droplet in sequence until the pair corresponding to the desired path for the particular droplet is activated, the only exception being that one path may correspond to no pairs being activated.

The figures shown and discussed above are not drawn to scale, and the number of droplet impact points and possible paths is less than would be used in a real system. They are exaggerated for clarity of presentation. The droplets' material preferably would not wet the surface of the control and monitor sites for reasons given earlier, except that the electrostatic forces when applied at the sites may cause wetting. It is of course possible to release droplets from the controller by removing the electrostatic force from the droplets after they proceed any fraction of the way along a control site instead of at the end of a site. Thus multiple paths may leave the controller in a spatial interval equal to the distance between control sites.

Before moving on to a third type of impact point sequencing scheme, it should be noted that a single droplet controller, such as the controllers shown in FIG. 4 and FIG. 6, which control by rotating droplet velocities with respect to the controller around a single axis, can also be used singly to form a column of characters, in sequence. They were previously only shown forming a row of characters. If the impacting and impacted points of FIG. 5A and FIG. 5B are rotated 90° degrees in the figures, then the sequence of FIG. 5B would be a part in the process of forming a column rather than a row of characters' matrices.

Figure 7A:
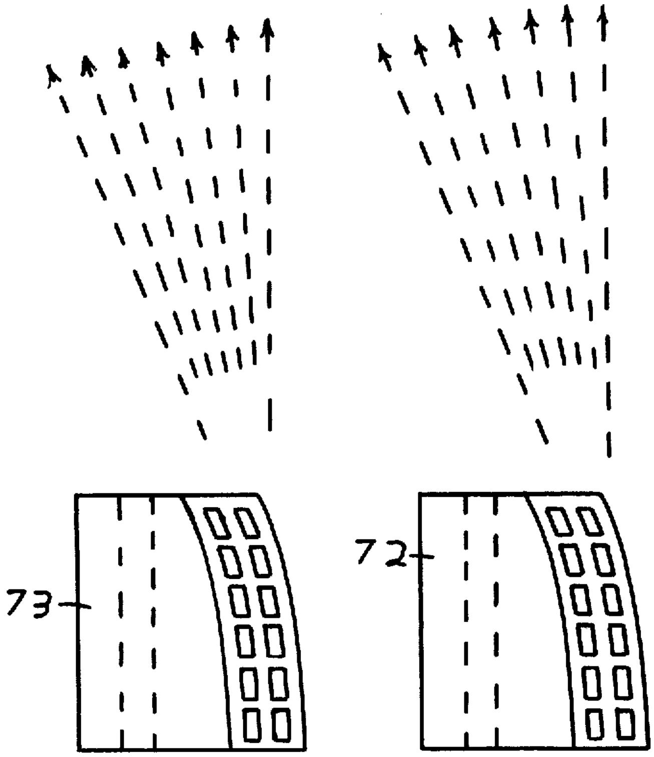
FIGS. 7A and 7B show a top and a side view of side by side selector-controllers such as the one shown in FIG. 6.
Figure 7B:
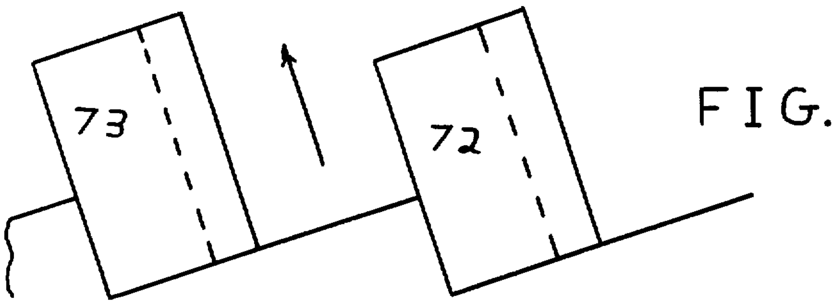

FIG. 7A shows a top (plan) view of two side by side droplet controllers each capable of forming a column of characters. The dashed lines with arrows on their ends represent possible droplet paths not all in the plane of the figure. FIG. 7B is a side (elevation) view of the same controllers viewed along a direction which would be straight up in FIG. 7A, the viewing direction of FIG. 7B being approximately along the direction of travel of the droplets which impact the controllers. For clarity, an additional droplet landing region on the controllers has been omitted. The droplets' velocities are selectively rotated by various angles around the arrow shown in FIG. 7B. The figure is cut on the left and there would be many other controllers along the same line as that containing controllers 73 and 72. Normally one controller would be used for each column of characters and a whole line of characters would be created simultaneously, while the output page is moved in the direction of a column past the controllers.

The controllers as a group could be molded as part of a single structure or they can be inset into a base holder as shown in FIG. 7B. Each controller is not much larger along its control face, droplet contact path, than a character of print. At least one electrical connection is necessary for each different control site. The control face can be printed around one end of a larger or longer block similar in dimensions to a grain of rice. Electrical connecters can be spread along a large surface of the grain-like block. This would make connection with the base holder easier than if all dimensions of the controller were equally small. It would be very cumbersome to provide a separate gutter for each stream of droplets, as would be necessary if some of the paths leaving the controllers would be chosen for guttering, because the droplet controllers of FIGS. 7A and 7B alter droplet trajectories predominantly toward neighboring controllers. Therefore, it would be best to station a pre-selector ahead of each controller, so that all droplets actually contacting a controller would be destined for impact on the output means. The pre-selectors could all alter the trajectories of unselected versus selected droplets roughly perpendicular to the line of controllers. Thus a single gutter would suffice for all streams, and only selected droplets would reach the controllers.

Figure 8:
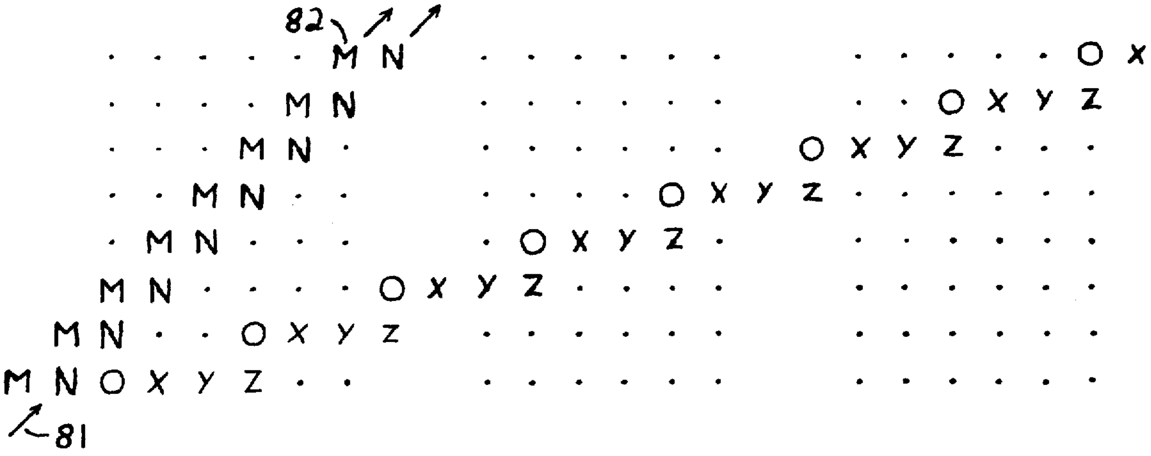
FIG. 8 shows part of an array of potential impact points and a set of simultaneous potential impact points, spaced with larger spacing than the spacing between rows and columns of the array.

A third impact point sequencing scheme, which provides an array of possible impact points more closely spaced than the actual droplet streams in both array directions is shown in FIG. 8. The dots represent possible impact points. In the depicted case the three rectangular arrays of dots represent three side by side locations at each of which a character may be formed by an appropriate choice of the dots at which droplets will impact. If a line of character positions is being scanned from left to right, then the circled dots in FIG. 8 represent substantially simultaneous possible impact points for selected droplets, one droplet from each of eight streams, these being the only eight streams associated with production of the line of characters. The word "possible" means that only those droplets necessary and useful in forming the desired characters will be selected for actual impact on the output means. The "X"s represent possible impact points for the next successive droplet in each of the eight streams, only one point being possible for each stream. However droplets may be selected for impact or non-impact. Similarly, the "Y"s represent possible impact points for the next successive droplet in each stream after the "X" droplet and so forth. Notice that each successive possible impact point for any particular stream is displaced the same fixed vector distance to the right from the immediately preceding one no matter which stream is observed. The streams are moving to the right uniformly with respect to the output medium, thus causing succeeding impact points to move to the right, in no other way are droplet impact points from a particular stream variable or controlled in position. It is apparent that a whole line of characters and desirable impact points can be scanned by the current method in either direction right or left. Obvious modifications must be made at the beginning and end of a line of characters no matter which direction is used in the scan. Similarly, if desired, a set of streams can scan a column of character locations instead of a row. If it is desired to scan a whole page from top to bottom instead of side to side then each column can have a separate set of streams allocated to it and to no other column. Other configurations can group controllers for sets of columns, etc.

FIG. 8 may also be used to describe another impact point sequencing scheme closely related to the second such scheme discussed in relation to FIGS. 5, 4, 6, and 7. The same controllers can be employed in the new scheme if they are turned to rotate droplet velocity vectors around new axes. The points labelled "M" in FIG. 8 are possible impact points which can be produced one at a time in time sequence in the direction of the arrows. Similarly, the points labelled "N" are a sequence, in time in the direction of the arrows, of possible impact points, which follows the "M" sequence in time. The points labelled "M" correspond in time order to points 51 through 54 of FIG. 5B. Impact points relative to the droplet stream origin, analogous to points in FIG. 5A, fall on an "impact line" parallel to a line extending from the arrow 81 to the "M" numbered 82. The line of characters extends from left to right horizontally in FIG. 8. Thus the impact line makes an acute angle of about 50 degrees with the line of characters, not 90.

It is clear that all points in the matrices of FIG. 8 could be impacted by droplets spaced to the right or left of the "M" points by the spacing distance between side by side (corresponding) "M" and "N" points. This spacing is the distance moved by the controller during the period between impact of corresponding "M" and "N" droplets. The spacing between points in a series, i.e. nearest "M" points is less than twice the spacing between rows or columns of dots. Thus, this type of sequence is easily produced with controllers like those shown in FIGS. 4, 6, and 7. The controllers of FIG. 7 can be rotated roughly 45 degrees (rotating the vector shown in FIG. 7B by the same angle) to use this new scheme on each column. A common gutter for all controllers is now possible, since the control direction, impact line, is no longer along the line of controllers.

There are other obvious variances of the present invention which fall within the spirit and scope thereof as defined by the appended claims.

What is claimed is:

1. A droplet producing and detecting device comprising a means to produce a series of droplets, at least one monitor site contacted at respective times by at least some of said droplets, an electrical circuit used to produce a voltage between areas of said site, which areas are, during a respective period corresponding to each droplet of said series of droplets which contacts said site, simultaneously opposed in position by different parts of the droplet, said areas being interior to and substantially locally parallel to portions of surface of said site, said portions being contacted simultaneously by said different parts of the droplet, an electrical means which monitors the current in said electrical circuit, said current being affected by each droplet of said series of droplets which contacts said site at said portions of surface, said current being related to changes in induced electric charges at the interface between the site and the droplet.

2. The device as in claim 1 comprising at least one control site, which may be the said monitor site, said control site being contacted at respective times by at least some of said droplets in said series of droplets, an electrical circuit for the control site to produce a controllable voltage between a respective thin interior volume below each of at least two respective surface portions of said central site, each interior volume being for example part of a respective conducting plate, which surface portions of said control site are, during a period corresponding to each contacting droplet separately, simultaneously opposed in position by different parts of the droplet, the droplets which contact said surface portions of said control site being caused to travel a different path from the control site whenever a given voltage is applied between said respective thin interior volumes below said surface portions of said control site during droplet contact, than the path traveled from the control site whenever a sufficiently different voltage is applied between said respective thin interior volumes below said surface portions of said control site during droplet contact with the control site.

3. A process for producing lines of printed characters, which process comprises the steps of forming a stream of ink droplets, selecting certain droplets from said stream to impact an output means, while causing other droplets from said stream to follow paths not leading to the output means, causing relative motion of the origin of said stream of ink droplets with respect to said output means, the relative motion being parallel to a line of characters during production of said line of characters by said stream of ink droplets, whether the line of characters be in a row or a column or otherwise, controlling the motion of selected droplets relative to the droplet stream origin so that during travel to the output means controllable increments of velocity, including possibly a zero velocity increment, are added to the velocity of each said selected droplet, said increments having a set of values, each droplet having one of the increments added to its velocity, the said increments, excepting zero increments, all rotating the droplet velocity relative to said stream origin around substantially the same vector in space if the effects of gravity and aerodynamics on the direction of droplet velocity are ignored, each character in said line of characters being printed by selected droplets from said stream of droplets, each selected droplet falling on a point of a substantially rectangular point matrix, each point representing a possible droplet impact point, said point matrix being sequentially scanned for droplet impact when the corresponding droplet is selected and for no droplet impact when the corresponding droplet is not selected, the scan including sweep sequences of more than three successively scanned points along oblique lines of points in said matrix, the extreme points of each said sweep sequence being separated by a separation component parallel to and a separation component perpendicular to the direction of said relative motion, the relative motion being parallel to said line of characters, each said separation component being larger than twice the distance between nearest points in said point matrix.

4. A process for producing lines of printed characters, which process comprises the steps of forming a stream of ink droplets, selecting certain droplets from said stream to impact an output means, while causing other droplets from said stream to follow paths not leading to the output means, causing relative motion of the origin of said stream of ink droplets with respect to said output means, the relative motion being parallel to a line of characters during production of said line of characters by said stream of ink droplets, whether the line of characters be in a row or a column or otherwise, controlling the motion of selected droplets relative to the droplet stream origin so that during travel to the output means controllable increments of velocity, including possibly a zero velocity increment, are added to the velocity of each said selected droplet, said increments having a set of values, each droplet having one of the increments added to its velocity, the said increments, excepting zero increments, all rotating the droplet velocity relative to said stream origin around substantially the same vector in space if the effects of gravity and aerodynamics on the direction of droplet velocity are ignored, said vector, around which droplet velocities are rotated, being at least 30 degrees away from the said direction of relative motion.

* * * * *